US008466907B2

(12) United States Patent
Bell

(10) Patent No.: US 8,466,907 B2
(45) Date of Patent: Jun. 18, 2013

(54) AUTOMATIC BRIGHTNESS CONTROL FOR DISPLAYS

(75) Inventor: Cynthia S. Bell, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 387 days.

(21) Appl. No.: 12/587,906

(22) Filed: Oct. 15, 2009

(65) Prior Publication Data

US 2010/0039414 A1 Feb. 18, 2010

Related U.S. Application Data

(63) Continuation of application No. 09/524,029, filed on Mar. 13, 2000, now Pat. No. 7,928,955.

(51) Int. Cl.
*G09G 5/00* (2006.01)
*G06F 3/038* (2006.01)

(52) U.S. Cl.
USPC ............. 345/207; 345/77; 345/102; 345/690; 345/108; 345/211; 349/61; 349/62; 349/63; 349/64; 348/602; 362/97.1

(58) Field of Classification Search
USPC ................. 345/102, 426, 108, 207, 211, 690; 349/61-64; 348/602; 362/97.1-97.3
See application file for complete search history.

(56) References Cited

U.S. PATENT DOCUMENTS 4,291,979 A 9/1981 Yuasa et al.
4,319,237 A * 3/1982 Matsuo et al. ................ 345/101
4,367,932 A 1/1983 Ishikawa et al.
4,386,345 A * 5/1983 Narveson et al. ............... 345/22
4,514,727 A * 4/1985 Van Antwerp ................ 345/691
4,556,876 A * 12/1985 Shimizu et al. ............... 345/214
4,760,389 A 7/1988 Aoki et al.
4,847,483 A 7/1989 Nishibe et al.
4,888,599 A * 12/1989 Harwood et al. ............... 345/89
5,153,756 A * 10/1992 Ike ............................... 349/116
5,270,818 A 12/1993 Ottenstein
5,406,305 A * 4/1995 Shimomura et al. .......... 345/102
5,554,912 A * 9/1996 Thayer et al. ................. 315/157
5,589,934 A 12/1996 Hosoi et al.
5,684,294 A 11/1997 Kouhi
5,760,760 A * 6/1998 Helms ........................... 345/102

(Continued)

FOREIGN PATENT DOCUMENTS

EP 0883103 A1 12/1998
JP 8-242398 A 9/1996

OTHER PUBLICATIONS

Non Final Office Action Received for the U.S. Appl. No. 09/524,029, mailed on Mar. 21, 2002, 12 pages.

(Continued)

*Primary Examiner* — Lun-Yi Lao
*Assistant Examiner* — Md Saiful A Siddiqui
(74) *Attorney, Agent, or Firm* — Jordan IP Law, LLC

(57) ABSTRACT

An automatic brightness adjustment for devices with displays includes the capability to assess ambient light. The assessment may be made using circuitry, such as a light meter circuit, by exploiting exposure control circuitry, or using other approaches. The ambient light value is sent to a brightness adjustment driver, which may employ a look-up table to keep track of brightness adjustments for particular ambient conditions. The look-up table may include distinct adjustment values based upon the type of display.

9 Claims, 3 Drawing Sheets

U.S. PATENT DOCUMENTS

| | | | | | |
|---|---|---|---|---|---|
| 5,818,553 | A * | 10/1998 | Koenck et al. | 349/61 |
| 5,850,205 | A * | 12/1998 | Blouin | 345/102 |
| 5,952,992 | A * | 9/1999 | Helms | 345/102 |
| 5,961,570 | A | 10/1999 | Inamori | |
| 6,046,730 | A | 4/2000 | Bowen et al. | |
| 6,078,302 | A | 6/2000 | Suzuki | |
| 6,094,185 | A * | 7/2000 | Shirriff | 345/102 |
| 6,256,067 | B1 | 7/2001 | Yamada | |
| 6,337,675 | B1 | 1/2002 | Toffolo et al. | |
| 6,411,306 | B1 * | 6/2002 | Miller et al. | 345/690 |
| 6,611,249 | B1 * | 8/2003 | Evanicky et al. | 345/102 |
| 2002/0109664 | A1 * | 8/2002 | Shimada | 345/102 |

OTHER PUBLICATIONS

Non Final Office Action Received for the U.S. Appl. No. 09/524,029, mailed on Oct. 16, 2007, 10 pages.

Final Office Action Received for the U.S. Appl. No. 09/524,029, mailed on Jul. 16, 2002, 10 pages.

Final Office Action Received for the U.S. Appl. No. 09/524,029, mailed on Mar. 28, 2008, 8 pages.

Notice of Allowance Received for the U.S. Appl. No. 09/524,029, mailed on Dec. 15, 2010, 7 pages.

* cited by examiner

AUTOMATIC BRIGHTNESS CONTROL FOR DISPLAYS

This application is continuation of co-pending U.S. patent application Ser. No. 09/524,029, filed Mar. 13, 2000, entitled AUTOMATIC BRIGHTNESS CONTROL FOR DISPLAYS.

BACKGROUND

This invention relates to devices with displays and, more particularly, to control of display brightness.

Devices which include displays come in a variety of packages. Notebook computers, personal digital assistants, cellular phones, hand-held computers, camcorders, and cameras are but a few of the devices which may include displays.

Particularly for mobile products, a user may potentially view the display in a broad range of environmental, or ambient, illumination conditions. Since the eyes adapt to the ambient luminance, a change in the environment may result in the display no longer being readable. For example, some mobile products use a liquid crystal display (LCD) that is readily visible in bright ambient lighting conditions, but operates using a backlight for dim surroundings.

The inability to see the display may present problems for the user. For example, there may be environments where the display is too bright to view comfortably as well as environments where the user is unable to see any display information. In the latter situation, the user may conclude that the product is non-functional. Further, since the ability to perceive color and contrast are a function of luminance, the failure to maintain display brightness may cause display information to be unperceivable.

A common technique is to provide the viewer with a manual control to adjust the display brightness. For some mobile products, such as notebook computers, having a manual adjustment may be adequate. For other products, such as personal digital assistants (PDAs), adjusting the display brightness may become problematic, as the PDA may be moved frequently from place to place.

Other devices, such as some of the newer portable web browsers, use microdisplays with magnifying optics. These devices generally require the user to look into an eye piece. Because ambient light is not illuminating the display surface, these devices must be luminous in order to be seen.

For all of these devices, an automatic brightness adjustment would make the devices easier to use. Thus, a need exists for a way to automatically adjust the brightness of displays.

DETAILED DESCRIPTION

Brightness is commonly defined as the magnitude of the visual sensation produced by light. Luminance is the magnitude of the light. Thus, according to one embodiment of the invention, the brightness setting for a display may be modified by first assessing the ambient luminance level and then using this assessment to select an appropriate display brightness setting.

Figure 1:
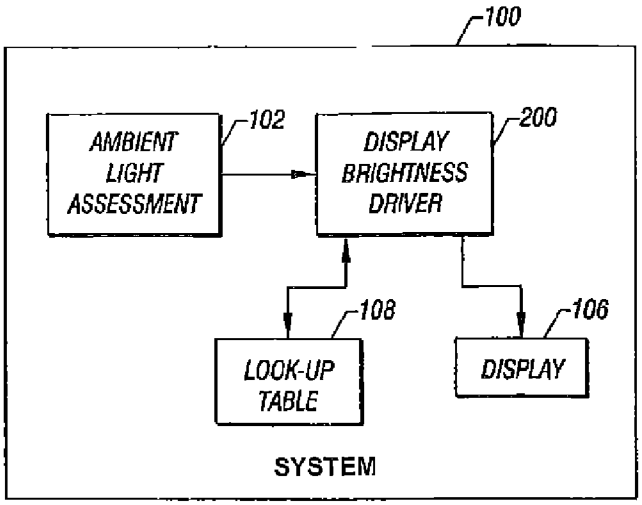
FIG. 1 is a block diagram of a system including a display according to one embodiment of the invention.

In FIG. 1, a system 100, such as a mobile information or communication device, includes a display 106. This display may be one of a variety of displays, such as a liquid crystal display (LCD), a plasma display, a backlit LCD, an organic light-emitting diode (OLED), to name a few.

In one embodiment of the invention, the system 100 includes an ambient light assessment block 102. The ambient light assessment block 102 may receive and quantify luminance information. The system 100 further includes a display brightness driver 200, which accepts the luminance information from the ambient light assessment block 102 in order to adjust the brightness of the display 106. The display brightness driver 200 may be implemented using hardware, software, or a combination of hardware and software.

In one embodiment of the invention, the system 100 includes a look-up table 108 in the display brightness driver 200. The look-up table 108 may be implemented in a storage device that stores values representing ambient luminance and corresponding values for setting the display brightness. These values may be predetermined as optimal values for a specific display's output over a given range of light levels.

It is not unusual for digitally interfaced display devices to use a look-up table to store drive values. Display systems typically have calibration issues, e.g., operational thresholds and characteristic curves, which are accommodated when changing the brightness of the display. The LUT for each display system may thus include the display calibration information.

The calibration operation is typically a final stage in the manufacture and test for a display. The results of the calibration test may then be stored in the LUT for the display. The LUT may thus include calibrated pairs of target output brightness and the respective drive signal level used to achieve the target output brightness.

The LUT entry is commonly selected by receiving a user request to increase or decrease the brightness, such as from ±brightness buttons on a television remote control or a menu and thumbwheel command from a cell phone. Rather than rely on user control, according to the embodiments described herein, the display brightness operation is automated, based upon the ambient light measured, to determine which entry in the LUT to select.

In one embodiment of the invention, the system 100 is a processor-based system. The display brightness driver 200 may thus include software which is executable by the processor (not shown). The display brightness driver 200 may receive display brightness information from the look-up table 108, for example, for use in setting the brightness of the display 106.

Figure 2:
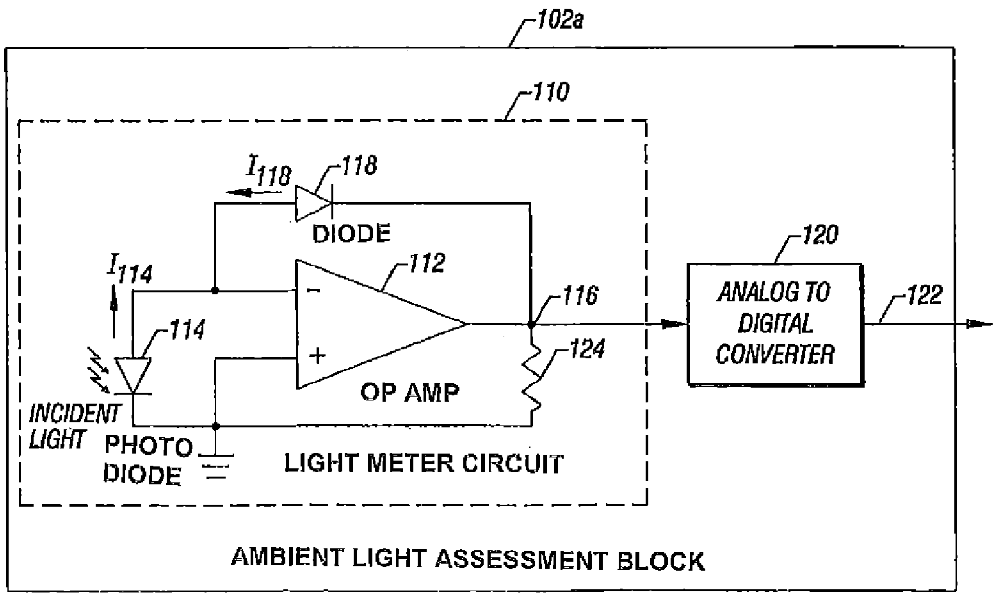
FIG. 2 is a diagram of a circuit for ambient light assessment according to one embodiment of the invention.

The ambient light assessment block 102 may comprise circuitry for quantifying incoming light. For example, in the embodiment of FIG. 2, an ambient light assessment block 102a comprises a light meter circuit 110 and an analog-to-digital converter 120. Such light meter circuits are very well-known in the art. The light meter circuit 110 receives incident light and quantifies the incoming energy as a voltage 116. The analog-to-digital converter 120 converts the voltage 116 to a digital value 122. The digital value 122 may then be sent to the display brightness driver 200, for setting the brightness of the display 106.

The light meter circuit 110 comprises a photopic photocell 114, a diode 118, an op amp 112, and a resistor 124. Because the diode 114 receives incident light, with no voltage bias across the p-n junction, a photo current, $I_{114}$, thus flows from the diode 114 proportional to the received incident light.

To understand how the light meter circuit 110 operates, assume the op amp 112 is an ideal op amp. Op amps are extremely high gain circuits. The voltage difference between the inverting (−) and the non-inverting (+) inputs of the op amp 112 is very close to zero. The non-inverting input (+) of the op amp 112 is connected to ground. Accordingly, the voltage of the inverting input (−) is close to ground as well.

Since the voltage of the inverting input is close to zero, the current, $I_{114}$, flowing from the photodiode 114 is close to being equal to a current, $I_{118}$, flowing from the diode 118, applying well-known circuit equation rules.

Since the voltage across a diode is approximately the logarithm of the current through the diode, the voltage 116 is approximately the logarithm of the current, $I_{118}$, and, therefore, the current, $I_{114}$. Thus, the light meter circuit 110 produces a voltage 116 which is a logarithm proportional to the incoming light intensity.

The resistor 124 is coupled to the photodiode 114. This feedback of the light meter circuit 110 controls the impedance of the output voltage 116. By having a circuit 110 which produces a logarithmic output, a much broader range of intensity may be measured than would be possible using a linear circuit.

Returning to FIG. 1, in one embodiment of the invention, the look-up table 108 contains the display brightness driver control settings that have been optimally predefined for the range of light levels. Once a light level, as measured by the light meter circuit 110 of FIG. 2, for example, is matched to the nearest index reference value of the look-up table 108, the table entry may be read as the new brightness for the display 106.

For some products, the ambient light assessment block 102 may use circuitry which is already available for other purposes. For example, for image capture devices such as charged coupled device (CCD) cameras or complementary metal oxide semiconductor (CMOS) imagers, circuitry which adjusts exposure settings, for example, may be used to assess ambient luminance levels.

For example, an imaging device may include a plurality of photocells, arranged as an array of sensors. The sensors accumulate energy from the incident light. At the end of an integration interval the sensors produce an indication of the accumulated energy, such as an analog voltage value. The accumulated energy is also the intensity of the light received by each sensor.

These imagers are designed to take good pictures. The best pictures are usually taken after the exposure parameters have been adjusted according to the amount of light in the scene being shot. If the accumulated energy of one or more sensors is too high (e.g., is over-exposed), the integration time may be decreased. Likewise, for sensors which are under-exposed, the integration time may be increased. This process may be repeated as needed. Once an appropriate integration time is determined, the imaging device may take a good picture.

The ambient luminance may also be evaluated once the integration time has been realized. The relationship between luminance and integration time is shown by the following formula:

$$L=KA^2/(TS)$$

where the luminance, L, is in candelas per square meter (cd/m$^2$), K is a constant, A is the aperture of the taking lens in meters, T is the integration time of the imager in seconds (sec), and S is the effective ISO speed as defined by the International Standards Organization (ISO). Since K, A, and S are typically constant for a given device, the equation shows that luminance is inversely related to the integration time.

Figure 3:
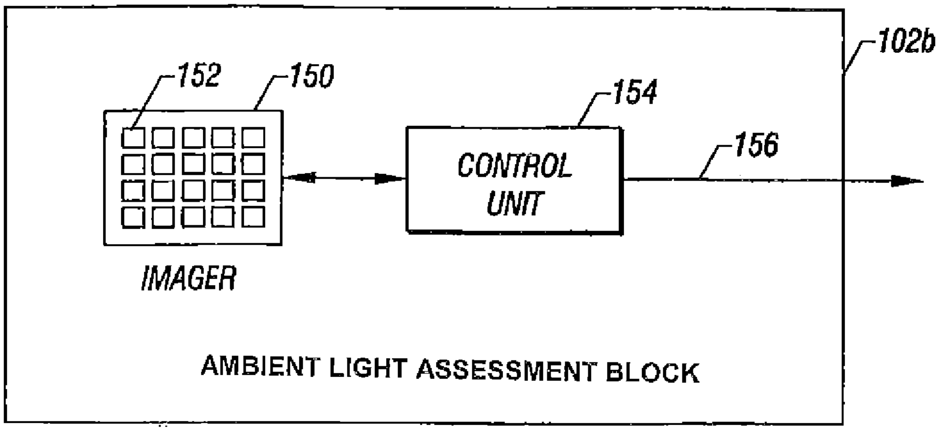
FIG. 3 is a block diagram of a system with an imager according to one embodiment of the invention.

Turning to FIG. 3, in a second embodiment of the invention, an ambient light assessment block **102*b* may comprise an imager 150, for receiving ambient light as well as a control block 154, for calculating the integration time. In FIG. 3, the ambient light assessment block 102*b* may be part of a digital camera, for example. The ambient light assessment block 102*b*** thus uses circuitry already adapted to performing exposure adjustment, as described above.

The imager 150 may electrically capture an optical image (not shown). The imager 150 includes an array of photon sensing sensors 152. During an integration time, each sensor 152 typically measures the intensity of a portion of a representation of the optical image that is focused onto the imager 150. At the end of the integration time, as described above, the energy accumulated onto the sensor 152 is sent to the control unit 154 as a discrete value, such as an analog voltage.

The control unit 154 may adjust the integration time for the sensors 152 such that the imager 150 is set to the proper exposure. In one embodiment of the invention, the control unit 154 sends an integration time value 156 to the display brightness driver 200 (FIG. 1). In the display brightness driver 200, for example, software may include the above formula to derive the ambient luminance, based upon the integration time value 156 received from the control unit 154.

The display brightness driver 200 may use the calculated ambient luminance value as an index into the look-up table 108, which may, in turn, provide a corresponding display brightness value. Using this value, the display brightness driver 200 may adjust the brightness of the display 106. In this manner, the circuitry used to adjust the exposure of the device may also be exploited to adjust the brightness of the display 106.

The look-up table 108 provides a translation between the ambient luminance level and the desired display brightness. In one embodiment of the invention, the look-up table values are derived based upon two eye adaptation processes which take place. First, direct adaptation is the slow sensitivity adjustment of the eye to the average luminance of whatever is being intently viewed. Second, lateral adaptation is a faster process in which the eye reacts to the average luminance of the environment.

If the display 106 of the system 100, for example, is adjusted according to the ambient luminance at all times, then the average luminance of whatever is being viewed (the display 106) and the average luminance of the environment will be the same. In other words, there will be no conflict between the direct and lateral adaptations for the viewing eye. This enables the viewer to immediately perceive information on the display 106 without experiencing a delay for adaptation.

Likewise, once the viewer stops looking at the display, the ability to quickly see objects external to the display is preserved. Thus, any safety issues due to re-adaptation, such as temporary visual impairment, may be avoided.

In one embodiment of the invention, a perceived brightness value may be calculated such that conflicts between direct and lateral adaptations of the viewer's eye are avoided. Using different ambient luminance values, the perceived brightness may be calculated, providing entries for the look-up table 108. The relationship for perceived brightness versus scene luminance is:

$$B=AL^{1/3}-S$$

where $A=100/(L_{AVG}^{1/3}+K)$ and $S=100(\Sigma S_i A_i L_i^{1/3})$.

B is the perceived brightness in LUX, A is the direct adaptation effect, L, $L_i$ and $L_{avg}$ are environmental luminances in $cd/m^2$, K is 3.6, and S is the lateral adaptation effect made up of the sum of weighted adaptations to spot luminances in proportion to their angular displacement from the axis of vision.

In one embodiment of the invention, the data in the look-up table 108 may also be customized for the type of display being driven. For example, a direct view LCD with the latest light steering films, is readily visible without backlighting at many everyday light levels. Such a display may be found on a cellular phone or personal digital assistant (PDA), for example. Using a direct view LCD in daytime, outdoor and general indoor conditions, the display backlight may thus remain in an off state. When the ambient illumination is low enough for the eye to move from the photopic, or bright light vision, to the scotopic, or dim light vision, the display backlight may be turned on.

Recall that, to control the brightness of the display 106, the look-up table 108 acts as a translator between ambient luminance and desired display brightness for that ambient luminance. Accordingly, in one embodiment of the invention, the look-up table 108 comprises a set of entries for ambient luminance, and corresponding entries for display brightness. When the ambient light assessment block 102, for example, uses an ambient luminance value as an index into the table 108, a desired display brightness may be received.

Figure 4:
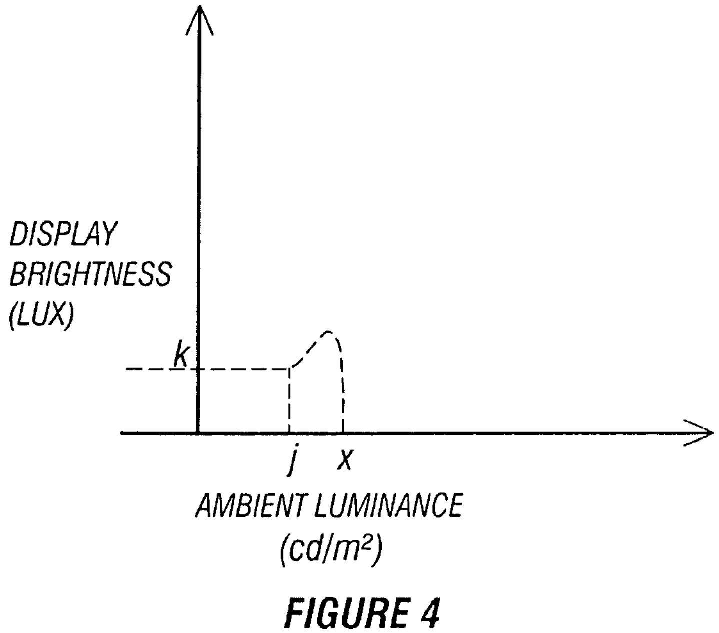
FIG. 4 is a graph of the display brightness vs. ambient luminance of a display according to one embodiment of the invention.

In FIG. 4, a graph of backlight brightness versus ambient luminance for a hypothetical direct view LCD is plotted. Using the graph, appropriate values for the look-up table 108 may be derived for such a direct view LCD display. For example, in very low light ambients, a display brightness of k LUX may be sufficient to readily view the display. Thus, entries in the look-up table 108 which are referenced in low light environments may include the value k.

Entries in the look-up table 108 which are referenced in moderate light environments may likewise include the value k, that is, until the ambient luminance reaches j $cd/m^2$, as shown in FIG. 4. At this point, the display brightness, and thus the entries in the look-up table 108, may be increased in value in proportion to the ambient luminance. Once the ambient luminance reaches x $cd/m^2$, however, the display brightness may be turned off. This is possible because the display has become readable without the assistance of the backlight. Likewise, beyond x $cd/m^2$, entries in the look-up table 108 corresponding to bright light environments, according to the graph of FIG. 4, are zero, meaning that the backlight is off, for the hypothetical direct view LCD display.

Another type of display for which brightness may be controlled automatically is a microdisplay. A variety of microdisplays are available, from frontlit LCD on silicon, to backlit transmissive LCDs and organic LEDs, to name a few. Microdisplays may be found in the active view finder of a camcorder or digital camera, for example.

Microdisplay systems are typically emissive; that is, they emit light, in order to be viewable in any brightness setting. As the brightness of the environment decreases, the brightness of the display is proportionally reduced for viewing. In a very dark environment, a minimum brightness level may afford comfortable viewing.

Microdisplays are often mounted in an eye cup in order to exclude external light. Thus, the brightness of the environment should not affect the ability to see the microdisplay. However, the eyes of the viewer automatically adjust when moving from the eye cup to the external environment, and vice versa. Thus, despite the exclusion of external light upon the microdisplay, adjusting the display brightness based upon the ambient lighting may be beneficial for the viewing the microdisplay.

Figure 5:
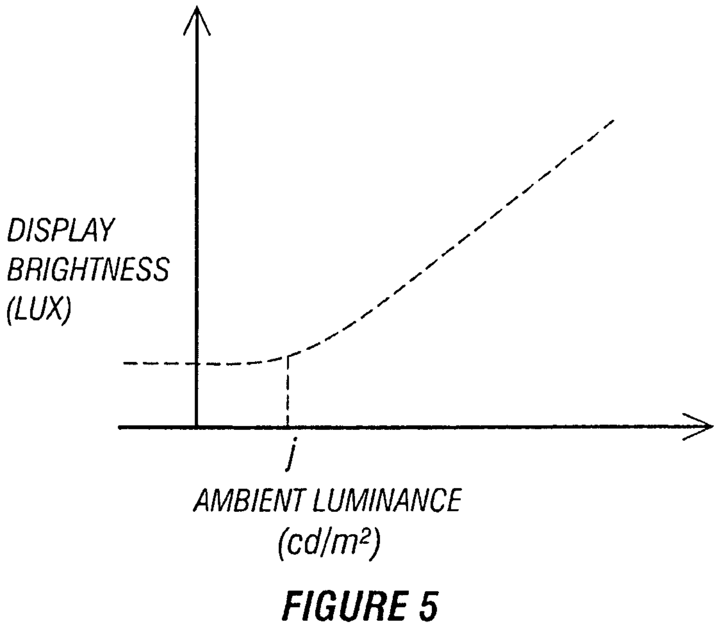
FIG. 5 is a graph of the display brightness vs. ambient luminance of a display according to a second embodiment of the invention.

In FIG. 5, a graph showing a relationship between the display brightness and the ambient luminance for a hypothetical microdisplay is plotted. For low ambient luminance levels, a minimum but non-zero display brightness permits viewing of the microdisplay. Once the ambient luminance reaches j $cd/m^2$, however, the display brightness also increases, in a somewhat linear fashion.

An automatic brightness adjustment, particularly for mobile telecommunications and/or information devices, may yield several benefits. In one embodiment of the invention, the automatic setting of display brightness makes a product easier to use, as viewers may avoid making manual brightness adjustments, as they move from location to location, just to properly view the display information. In a second embodiment of the invention, the automatic setting of display brightness manages battery energy. This ensures the energy is expended on display illumination only when and in the amount necessary. Where an automatic display brightness feature is found, the viewer may be able to see the display and thus be confident that the product is functioning properly.

Figure 6:
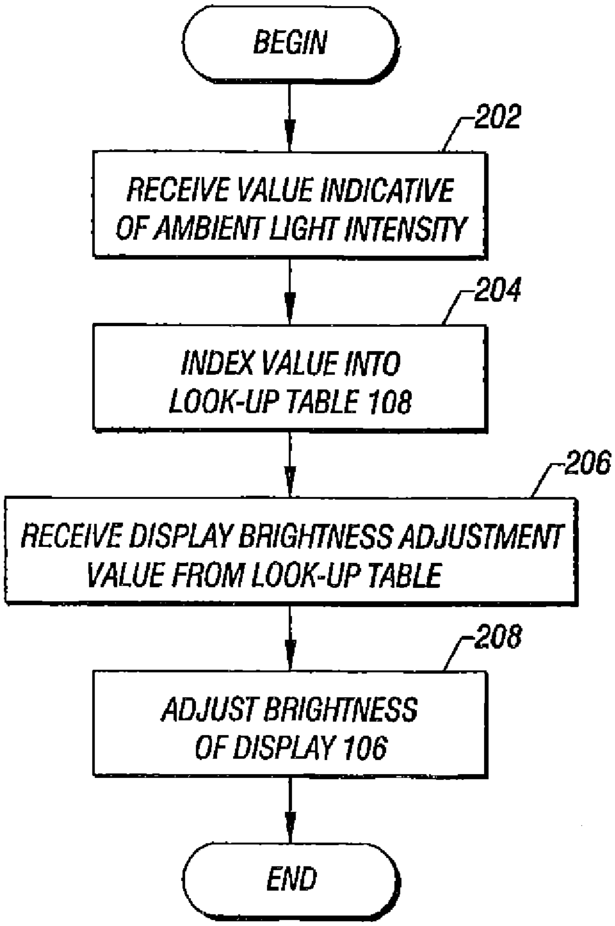
FIG. 6 is a flow diagram of display brightness adjustment according to one embodiment of the invention.

In FIG. 6, a flow diagram illustrates the operation of the display brightness driver 200 of FIG. 1, according to one embodiment of the invention. The system 100 receives ambient light, quantifies the information received, and digitizes the information as a discrete value, such that the display brightness driver 200 may interpret the data (block 202). The discrete value may, for example, be used as an index into the look-up table 108 (block 204). In the look-up table 108, a display brightness adjustment value associated with the index value, is determined (block 206). Using the display brightness value, the display brightness driver 200 may then adjust the display 106 (block 208).

Alternatively, the ambient light may be fed into circuitry which translates the signal into a second signal, corresponding to a display brightness value, without using a look-up table. The display brightness value may be fed into circuitry which automatically adjusts the brightness of the display 106, without using a software program. Other implementations and embodiments are possible for performing automatic display brightness adjustment, based upon the ambient conditions.

Thus, an automatic brightness adjustment, particularly for mobile communications and/or information devices, may make products with displays easier to use, in some embodiments of the invention. Where ambient brightness conditions change, the automatic brightness adjustment responds such that the display remains viewable. Where the display draws less power, battery life may be conserved. Where a display is adjusted to match ambient conditions, safety issues due to eye adjustment may be avoided.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A processor-based mobile information device, comprising:

a processor;

a display coupled to the processor;

an ambient light sensor, wherein the ambient light sensor comprises a charge coupled device; and circuitry on the mobile information device to:

store display brightness information based on a current ambient light condition sensed by the ambient light sensor, wherein the brightness information is to be derived from at least one of a first eye adaption process which takes into account a slow sensitivity adjustment of an eye to the average luminance of an object being viewed and a second eye adaption process which takes into account a reaction of the eye to an average luminance of a surrounding environment; and automatically adjust a brightness of the display based on the stored information and changes in the ambient light condition sensed by the ambient light sensor.

2. The processor-based mobile information device of claim 1, wherein the changes in the ambient light condition sensed by the ambient light sensor are based on an integration interval.

3. The processor-based mobile information device of claim 1, wherein the charge coupled device is part of an image capture circuit for a camera.

4. The processor-based mobile information device of claim 1, wherein the circuitry to store display brightness information based on a current ambient light condition further comprises circuitry to perform a calibration operation to store display brightness information based on a current ambient light condition sensed by the ambient light sensor.

5. The processor-based mobile information device of claim 4, wherein the circuitry on the mobile information device comprises a lookup table.

6. The processor-based mobile information device of claim 5, wherein the lookup table is configured to store information representing ambient light conditions and corresponding display brightness information.

7. The processor-based mobile information device of claim 6, wherein the lookup table is configured to store information representing ambient light conditions and corresponding display brightness information based on the calibration operation.

8. The processor-based mobile information device of claim 1, wherein the ambient light sensor comprises a charge coupled device.

9. The processor-based mobile information device of claim 8, wherein the charge coupled device is part of an image capture circuit for a camera.

* * * * *